| 
US008701015B2

(12) United States Patent
Bonnat

(10) Patent No.: US 8,701,015 B2
(45) Date of Patent: Apr. 15, 2014

(54) METHOD AND SYSTEM FOR PROVIDING A USER INTERFACE THAT ENABLES CONTROL OF A DEVICE VIA RESPIRATORY AND/OR TACTUAL INPUT

(76) Inventor: Pierre Bonnat, Las Vegas, NV (US)

( * ) Notice: Subject to any disclaimer, the term of this patent is extended or adjusted under 35 U.S.C. 154(b) by 866 days.

(21) Appl. No.: 12/056,187

(22) Filed: Mar. 26, 2008

(65) Prior Publication Data

US 2009/0247222 A1 Oct. 1, 2009

(51) Int. Cl.
*G06F 3/00* (2006.01)
*G06F 3/048* (2013.01)
*G06F 3/041* (2006.01)
*G06F 9/44* (2006.01)
*G06F 3/0488* (2013.01)

(52) U.S. Cl.
CPC .......... *G06F 9/4443* (2013.01); *G06F 3/04886* (2013.01); *G06F 3/0488* (2013.01)
USPC ........... 715/744; 715/749; 715/762; 715/765; 715/835; 715/847; 345/173

(58) Field of Classification Search
CPC .. G06F 3/0488; G06F 3/04886; G06F 9/4443
USPC ......... 715/744, 762, 763, 835, 847, 864, 748, 715/765, 749, 866; 345/173
See application file for complete search history.

(56) References Cited

U.S. PATENT DOCUMENTS

| 4,207,959 A | 6/1980 | Youdin et al. |
| 4,433,685 A | 2/1984 | Giorgini et al. |
| 4,521,772 A | 6/1985 | Lyon |
| 4,561,309 A | 12/1985 | Rosner |
| 4,713,540 A | 12/1987 | Gilby et al. |
| 4,746,913 A | 5/1988 | Volta |
| 4,929,826 A | 5/1990 | Truchsess et al. |
| 5,341,133 A | 8/1994 | Savoy et al. |
| 5,378,850 A | 1/1995 | Tumura |

(Continued)

FOREIGN PATENT DOCUMENTS

JP 10320108 12/1998
WO WO 2008/030976 3/2008

OTHER PUBLICATIONS

European Patent Office, International Search Report, in PCT/US03/32203, dated Aug. 24, 2005.

(Continued)

*Primary Examiner* — Nicholas Ulrich
(74) *Attorney, Agent, or Firm* — McAndrews, Held & Malloy, Ltd.

(57) ABSTRACT

A method and system are provided for a user interface that enables control of a device via respiratory and/or tactual input. A mobile device comprising a graphical user interface may receive data from a second device and/or locally from within the mobile device. The data may be associated with and/or mapped to multimedia content that may be retrievable from a content source. The content source may be external to the mobile device and the second device. The associating and/or mapping may occur at either the mobile device or the second device and the associated or mapped data may be operable to function as at least a portion of the graphical user interface of the mobile device. The graphical user interface may be customized utilizing the data that is associated and/or mapped to the media content. The second device may map the received data to the media content.

43 Claims, 11 Drawing Sheets

(56) References Cited

U.S. PATENT DOCUMENTS

| | | | |
|---|---|---|---|
| 5,422,640 A * | 6/1995 | Haley | 341/21 |
| 5,603,065 A * | 2/1997 | Baneth | 710/73 |
| 5,740,801 A | 4/1998 | Branson | |
| 5,763,792 A | 6/1998 | Kullik | |
| 5,835,077 A | 11/1998 | Dao | |
| 5,889,511 A | 3/1999 | Ong et al. | |
| 5,907,318 A | 5/1999 | Medina | |
| 6,040,821 A | 3/2000 | Franz | |
| 6,213,955 B1 | 4/2001 | Karakasoglu et al. | |
| 6,261,238 B1 | 7/2001 | Gavriely | |
| 6,323,846 B1 | 11/2001 | Westerman | |
| 6,396,402 B1 | 5/2002 | Berger et al. | |
| 6,421,617 B2 | 7/2002 | Felsenstein | |
| 6,516,671 B2 | 2/2003 | Romo et al. | |
| 6,574,571 B1 | 6/2003 | Bonnat | |
| 6,664,786 B2 | 12/2003 | Kretschmann | |
| 7,053,456 B2 | 5/2006 | Matsuo | |
| 7,398,474 B2 * | 7/2008 | Yan et al. | 715/763 |
| 7,418,472 B2 * | 8/2008 | Shoemaker et al. | 709/203 |
| 7,631,267 B2 * | 12/2009 | Viji et al. | 715/763 |
| 7,689,908 B2 * | 3/2010 | Yan et al. | 715/238 |
| 7,735,021 B2 * | 6/2010 | Padawer et al. | 715/810 |
| 7,880,727 B2 * | 2/2011 | Abanami et al. | 345/173 |
| 7,895,530 B2 * | 2/2011 | Leavitt et al. | 715/810 |
| 7,986,307 B2 * | 7/2011 | Zotov et al. | 345/173 |
| 2003/0208334 A1 | 11/2003 | Bonnat | |
| 2004/0017351 A1 | 1/2004 | Bonnat | |
| 2005/0127154 A1 | 6/2005 | Bonnat | |
| 2005/0268247 A1 | 12/2005 | Baneth | |
| 2006/0118115 A1 | 6/2006 | Cannon | |
| 2006/0142957 A1 | 6/2006 | Bonnat | |
| 2006/0288300 A1 * | 12/2006 | Chambers et al. | 715/744 |
| 2007/0048181 A1 | 3/2007 | Chang et al. | |
| 2007/0101297 A1 * | 5/2007 | Forstall et al. | 715/841 |
| 2007/0150816 A1 * | 6/2007 | Hariki | 715/733 |
| 2008/0215240 A1 * | 9/2008 | Howard et al. | 701/213 |
| 2009/0164928 A1 * | 6/2009 | Brown et al. | 715/767 |
| 2009/0178006 A1 * | 7/2009 | Lemay et al. | 715/835 |

OTHER PUBLICATIONS

European Patent Office, Preliminary Examination Report, in PCT/US03/32203, dated Mar. 29, 2006.

United States Patent and Trademark Office, Office Action, in U.S. Appl. No. 10/530,946, dated Oct. 5, 2007.

International Search Report and Written Opinion for International Patent Application Serial No. PCT/US09/38397, mailed May 26, 2009.

International Search Report and Written Opinion for International Patent Application Serial No. PCT/US09/038395, mailed May 27, 2009.

International Search Report and Written Opinion for International Patent Application Serial No. PCT/US2009/038384, mailed Jun. 10, 2009.

* cited by examiner

METHOD AND SYSTEM FOR PROVIDING A USER INTERFACE THAT ENABLES CONTROL OF A DEVICE VIA RESPIRATORY AND/OR TACTUAL INPUT

CROSS-REFERENCE TO RELATED APPLICATIONS/INCORPORATION BY REFERENCE

This application makes reference to:
U.S. application Ser. No. 12/056,164, which is filed on even date herewith;
U.S. application Ser. No. 12/055,999, which is filed on even date herewith;
U.S. application Ser. No. 12/056,203, which is filed on even date herewith;
U.S. application Ser. No. 12/056,171, which is filed on even date herewith; and
U.S. application Ser. No. 12/056,061, which is filed on even date herewith.

Each of the above referenced applications is hereby incorporated herein by reference in its entirety.

FIELD OF THE INVENTION

Certain embodiments of the invention relate to device interaction. More specifically, certain embodiments of the invention relate to a method and system for providing a user interface that enables control of a device via respiratory and/or tactual input.

BACKGROUND OF THE INVENTION

With the increasing popularity of electronics such as desktop computers, laptop computers, and handheld devices such as Smartphones, media players and PDA's, communication networks are becoming an increasingly popular means of exchanging data and/or content for a variety of applications. In this regard, networks are increasingly being utilized to carry, for example, voice, data, and multimedia. Accordingly more and more devices are being equipped to interact with and to access information from networked devices via commercial networks for example. In this regard, users may incur significant cost in purchasing service contracts with telecommunications and/or Internet service providers in order to access and/or download information. Furthermore, service provider users may be limited in their choices of applications and/or services.

Currently, most mobile devices are equipped with a user interface that allows users to access the services provided via the Internet. For example, some mobile devices may have browsers and software and/or hardware buttons may be provided to enable navigation and/or control of the user interface. Some mobile devices such as Smartphones are equipped with touch screen capability that allow users to navigate or control the user interface via touching with one hand while the device is held in another hand.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a method and system for providing a user interface that enables control of a device via respiratory and/or tactual input, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing a user interface that enables control of a device via respiratory and/or tactual input. In various embodiments of the invention, a method and system are provided for a user interface that enables control of a device via respiratory and/or tactual input. A mobile device comprising a graphical user interface may receive data from a second device and/or locally from within the mobile device. The data may be associated with and/or mapped to multimedia content and/or applications that may be retrievable from a content source. The content source may be, for example, external to the mobile device and the second device. The associating and/or mapping may occur at either the mobile device or the second device and the associated or mapped data may be operable to function as at least a portion of the graphical user interface of the mobile device and/or at least a portion of the graphical user interface of the second device as well as a plurality of other devices. The graphical user interface may be customized utilizing the data that is associated and/or mapped to the media content. The second device may map the received data to the media content.

Data that is mapped to the media content may be communicated from the second device to mobile device via a wired and/or wireless connection. Media content that is retrievable by the mobile device may comprise one or more of an RSS and/or markup language such as HTML and XML feed, a URL, and/or multimedia content. The expulsion of air caused by human breath may be utilized to control the mobile device via graphical user interface. Touch may also be utilized to control the mobile device via graphical user interface. The mobile device may comprise one or more of a personal computer (PC), a laptop, gaming device, telemetric device and/or a handheld communication device. The handheld device may comprise one or more of a mobile telephone, and/or a mobile multimedia player.

Figure 1:
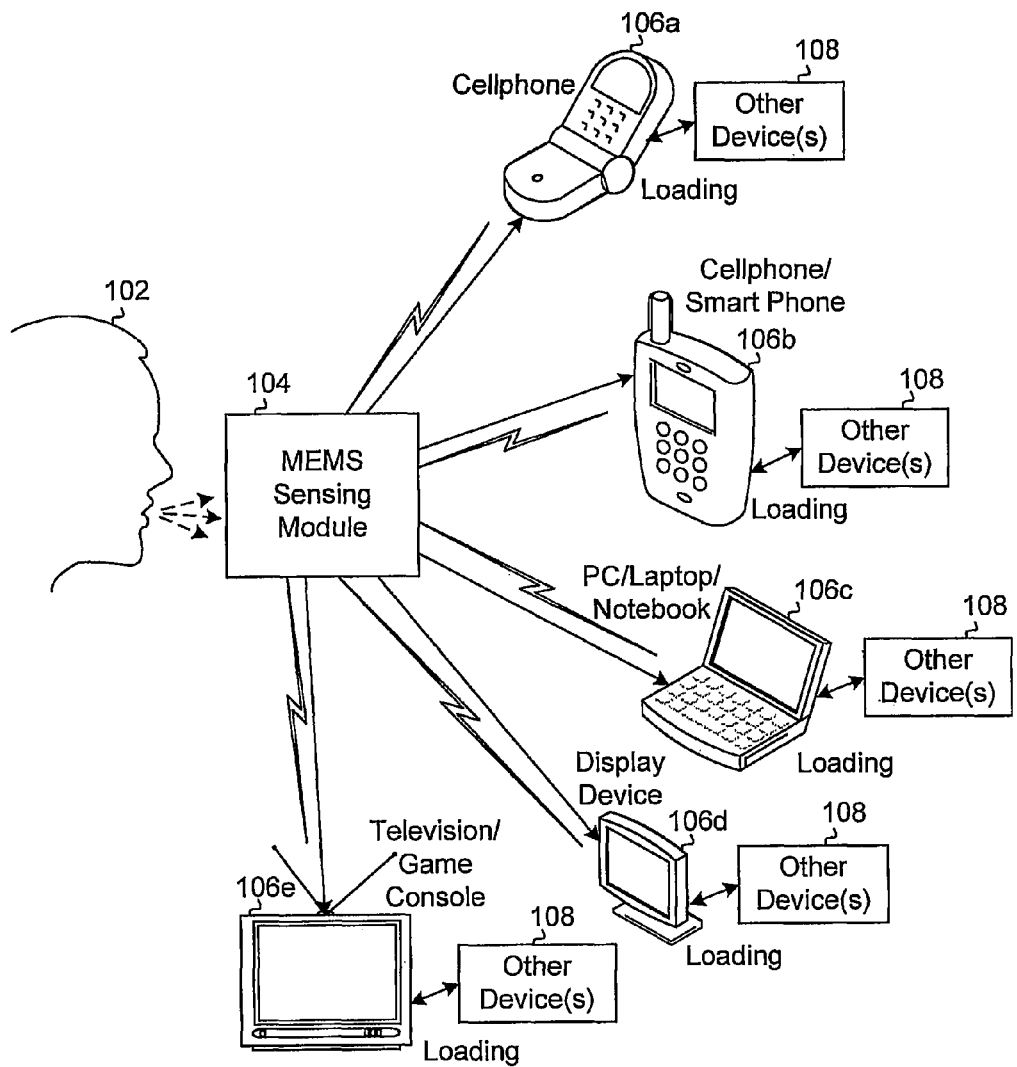
FIG. 1 is a block diagram of an exemplary system for interfacing with an electronic device via human respiration, in accordance with an embodiment of the invention.

FIG. 1 is a block diagram of an exemplary system for interfacing with an electronic device via human respiration, in accordance with an embodiment of the invention. Referring to FIG. 1A, there is shown a user 102, a micro-electro-mechanical system (MEMS) sensing module 104, and a plurality of electronic devices, collectively referred to herein as electronic devices 106, with which the user may interface via respiratory actions. Exemplary electronic devices may comprise a cell phone 106a, a smart phone 106b, a personal computer (PC), laptop or a notebook computer 106c, a display device 106d and/or a television (TV)/game console or other platform 106e. Each of the plurality of devices 106 may comprise a user interface. One exemplary embodiment of a user interface is a graphical user interface (GUI). Any information and/or data presented on a display including programs and/or applications may be part of the user interface. Each of the plurality of electronic devices 106 may be wired or wirelessly connected to a plurality of other devices 108 for loading, side loading of information and/or communication of information.

The MEMS sensing module 104 may be enabled to detect movement or change in composition, for example, ambient air composition caused by respiratory actions, such as inhalations and exhalations, of the user 102. In response to the detection of movement caused by respiratory actions, the MEMS sensing module 104 may be enabled to generate one or more control signals, referred to herein (where applicable) as respiratory input. The respiratory input may comprise one or more control signals that may be communicatively coupled to an electronic device 106 to effect a response in the electronic device. In this regard, respiratory action may provide input to an electronic device 106 in a manner similar to conventional input devices such as a trackball, mouse, keyboard, or microphone. In this regard, the generated one or more control signals may be enabled to control the user interface of one or more of the electronic devices 106.

In accordance with an embodiment of the invention, the detection of the movement caused by respiratory action may occur without use of a channel. The detection of the movement caused by respiratory action may be responsive to the respiratory action into open space and onto one or more detection devices or detectors, such as the MEMS module 104, which enables the detection.

In accordance with another embodiment of the invention, the MEMS sensing module 104 may be enabled to navigate within the user interface of one of more of the electronic devices 106, via the generated one or more control signals. The MEMS sensing module 104 may be enabled to scroll, select, or otherwise manipulate and/or affect objects displayed on and/or outputs of the electronic devices 106. The generated one or more control signals may comprise one or more of a wired and/or a wireless signal. An exemplary MEMS sensing module may be found in incorporated U.S. application Ser. No. 12/055,999.

In accordance with another embodiment of the invention, one or more of the electronic devices 106, may be enabled to receive one or more inputs defining the user interface from another device 108. The other device 108 may be one or more of a PC, laptop or a notebook computer 106c and/or a handheld device, for example and without limitation, a cell phone 106a and/or a smart phone 106b. The MEMS sensing module 104 may be enabled to customize the user interface of one or more of the electronic devices 106 so that content associated with one or more received inputs may become an integral part of the user interface of the device being controlled.

The invention is not limited to the expulsion of breath. Accordingly, in various exemplary embodiments of the invention, the MEMS may be enabled to detect the expulsion of any type of fluid such as air, and the source of the fluid may be an animal, a machine and/or a device.

Figure 2A:
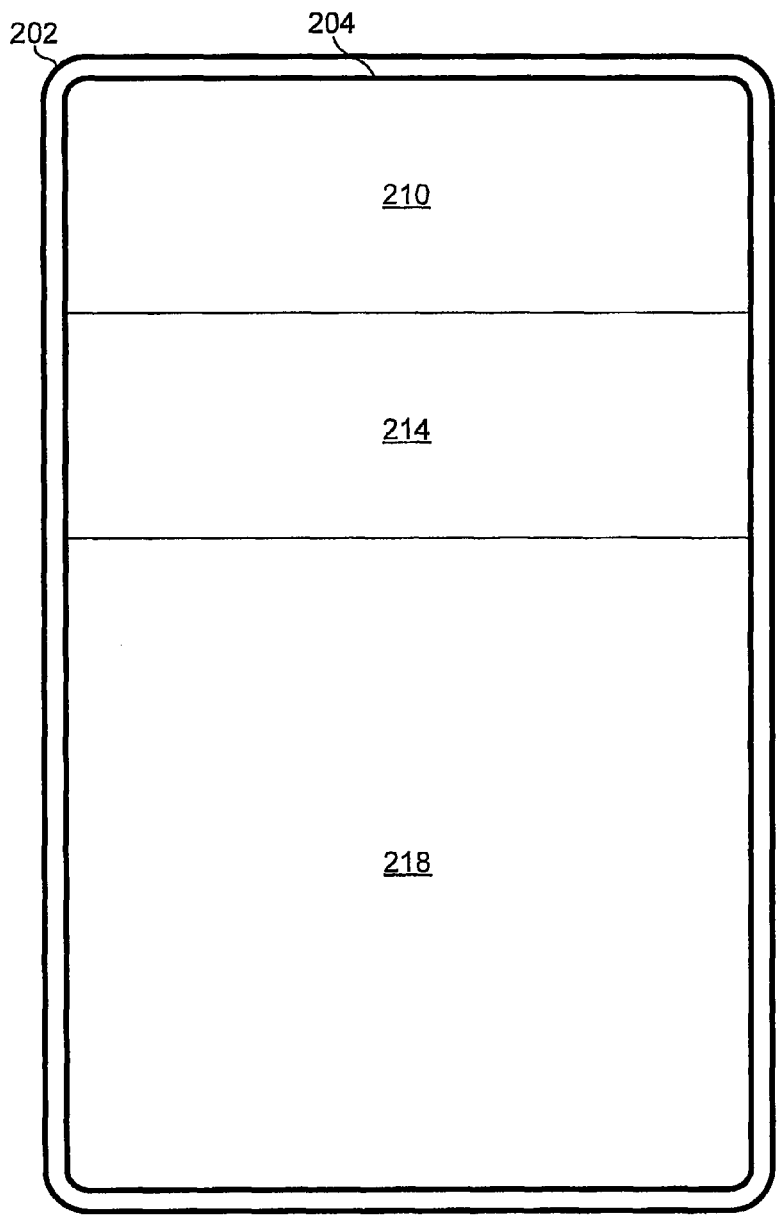
FIG. 2A is a diagram illustrating an exemplary electronic device that may be controlled via a sectional user interface, in accordance with an embodiment of the invention.

FIG. 2A is a diagram illustrating an exemplary electronic device that may be controlled via a sectional user interface, in accordance with an embodiment of the invention. Referring to FIG. 1, there is shown an electronic device 202 comprising a touchscreen display 204. In this regard, although a touchscreen display is utilized for illustration, the electronic device 202 may comprise a non-touchscreen display and one or more input devices such as, for example and without limitation, a trackball and/or trackwheel, one or more multi-function buttons, a keyboard, an accelerometer, gyroscope and camera based tracking without deviating from the scope of the present invention.

The electronic device 202 may comprise a user interface which may enable a user to navigate through and launch the various applications and/or functions on the electronic device 202. Additionally, the user interface of the electronic device 202 may display information about the status and/or capabilities of the electronic device 202 and/or display information and/or content generated by one or more applications on the electronic device 202. In various exemplary embodiments of the invention, upon powering ON the electronic device 202, a home screen of the user interface may be activated and/or displayed. The homescreen may be a default homescreen provided with the device or one which has been customized based on user preferences. Notwithstanding, in various embodiments of the invention, the electronic device 202 may comprise one or more of a cellular telephone, a Smartphone, a wireless telephone, a notebook computer, a personal media player, a personal digital assistant, a multimedia device, a handheld device and/or a multi-function mobile device.

Figure 2B:
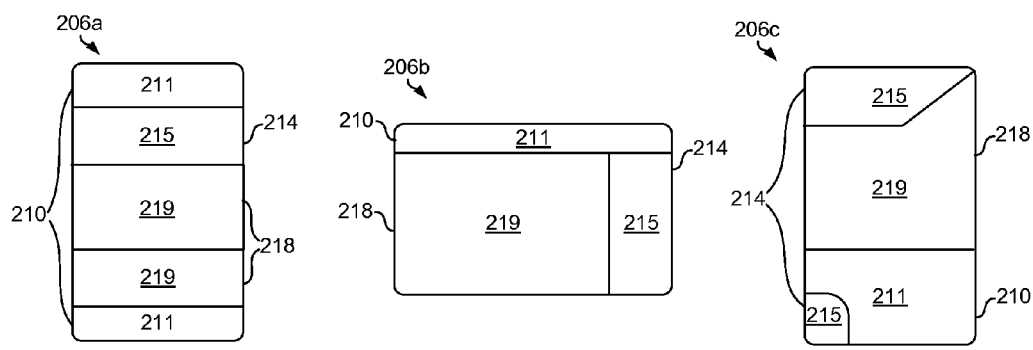
FIG. 2B is a diagram illustrating several exemplary configurations of a sectional user interface, in accordance with an embodiment of the invention.

The user interface may be sectioned into one or more of a fixed region 210 comprising one or more fixed zones, a navigation region 214 comprising one or more navigation zones, and a content region 218 comprising one or more content zones. In this regard, the regions 210, 214, and 218, may be of any size and/or shape and may be in any location(s) of the display 204. Moreover, the size, shape, and location(s) of the regions 210, 214, and 220 may be configured by a user of the electronic device 202. For example, the electronic device 202 may comprise a user interface customization application which a user may run to configure the regions of the user interface based on preferences such as whether the user is right handed or left handed. In this regard, exemplary configurations 206a, 206b, and 206c of the user interface are illustrated in FIG. 2B.

The fixed region 210 may display information independent of a state of and/or activity in the navigation region 214. Exemplary information that may be displayed in the fixed region 210 may comprise the day, the time, weather, appointments in a calendar, RSS or a markup language such as HTML, and XML, recent email contacts, and/or recent phone contacts. However, the preceding are just examples of information that may be displayed in the fixed region 210 and the invention may not be so limited. Furthermore, the type and/or amount of information displayed in the fixed region 210 may be customized by a user of the electronic device 202. In this regard, FIG. 2B illustrates some exemplary fixed regions 210a, 210b, and 210c.

The navigation region 214 may enable controlling the electronic device 202 such that desired information may be displayed and/or desired applications and/or functions may be launched on the electronic device 202. In this regard, respiratory and/or tactual input may be utilized to scroll, select, manipulate, or otherwise affect objects, such as text, images, links, and/or icons, of the user interface. In this regard, additional details of interacting with objects of the user interface utilizing respiratory and tactual input are described below.

The content region 218 may display information that may depend on a state of and/or activity in the navigation region 214. For example, the information in the content region 218 may depend on an active icon in the navigation region 214. In this regard, an active icon may be an icon which has been navigated to (via breath and/or tactual input) but has not been selected via a "click" (e.g., a puff of breath, a tap on a touch screen or a button press) or via a puff of air detectable via the MEMS sensing module 104. In one exemplary embodiment of the invention, the active icon may be linked to a website and the content region 218 may display RSS or a markup language such as HTML, and XML feed from that website. In another exemplary embodiment of the invention, the active icon may be a shortcut to launch an email client and the content region 218 may display one or more recent email messages. In this regard, exemplary information displayed in the content region 218 may comprise RSS or a markup language such as HTML, and XML feed, images, a calendar, recent calls, recent texts, and/or recent emails. However, the preceding are just examples and the invention is not so limited. Additionally, the information displayed in the content region 218 may be customizable by a user of the electronic device 202.

In various embodiments of the invention, the display 204 may be a touchscreen and the navigation region 214 may be responsive to a range of tactual inputs, as opposed to the fixed region 210 and/or the content region 218 which may have limited response to tactual inputs. For example, the navigation region 214 may be responsive to tactual movements, a number of touches, and/or duration of touches while the fixed region 210 and the content region 218 may be responsive to multiple touches or puffs of breath (e.g., a double tap). In this manner, limiting the amount of the display 204 that may be allocated to the navigation region 214 may reduce the amount of area that a user needs to be able to reach in order to navigate and select icons, thus facilitating single-handed operation of the electronic device 202. Additionally, in instances when the whole screen is active, limiting the tactual responsiveness of the fixed region 210 and the content region 218 may reduce inadvertent actions and/or selections (i.e., inadvertent "clicks").

In various embodiments of the invention, information in the fixed region 210 and/or the content region 218 may be displayed in the form of one or more objects, such as images, widgets, text, links and/or icons, and the objects may be selectable via tactual and/or respiratory input. However, the response of the fixed region 210 and/or the content region 218 may be limited, as described above, to prevent inadvertent clicks.

In various embodiments of the invention, respiratory, motion detection and/or tactual input may be utilized to interact with the electronic device 202 via a user interface. The user interface may comprise a navigation region 214, a fixed region 210, and a content region 218. The navigation region 214 may enable navigating and selecting of objects for the user interface, such as icons. The fixed region 210 that may enable display of information that may be independent of a state of, or activity in, the navigation region 214. The content region 218 may enable display or presentation of information that may depend on a state of, or activity in, the navigation region 214. Each of the regions 214, 210 and 218 of the user interface may comprise one or more zones, such as the zones 211, 215, and 219, and a size, shape, and/or location of each region may be customized by a user. Objects displayed in the fixed region 210 and/or content region 218 may be selectable via tactual input. The objects navigated and/or selected via the navigation zone 214 may be grouped into categories and each category may be associated with, for example, a background image. A user may utilize motion or tactual input to scroll though the categories and may utilize respiratory input to scroll through the objects grouped into a particular category, such as the active category. Information, such as the webpage, displayed on the electronic device 202 may be scrolled via respiratory input and scrolled via tactual input. Similarly, information, such as the webpage, displayed on the electronic device 202 may be enlarged and/or shrunk by utilizing tactual input to control a reference point for the enlarging and/or shrinking and utilizing respiratory input to control an amount by which to enlarge and/or shrink the information.

The sectional user interface of the electronic device 202 may be described as a universal content access manager (UCAM) which may provide advantages over traditional graphical user interfaces. The configurability (i.e. customization or personalization) of the UCAM may greatly increase the utility and/or ease of use of the electronic device 202 over a similar device having a conventional graphical user interface. In this regard, objects in each section may be sequenced, juxtaposed, superimposed, overlaid, or otherwise positioned and/or organized such that a user may quickly access desired information, applications, and/or functions. The ability to section the UCAM into one or more regions may greatly increase the utility and/or ease of use of the electronic device 202 over a similar device having a conventional graphical user interface. In this regard, portions of each region may be configured to be responsive or non-responsive to a variety of input types and may be configured to be active (e.g., updated in real-time) or passive (e.g., statically displayed until changed by a user) in terms of information and/or objects displayed therein.

FIG. 2B is a diagram illustrating several exemplary configurations of a sectional user interface, in accordance with an embodiment of the invention. Referring to FIG. 2B, there is shown exemplary user interface or UCAM configurations 206a, 206b, and 206c, each having a fixed region 210 comprising one or more fixed zones 211, a navigation region 214 comprising one or more navigation zones 215, and a content region 218 comprising one or more content zones 219. In this regard, the size, shape, and/or location of the fixed region 210, the navigation region 214, and the content region 218 may be configured by a user of the electronic device 202. The fixed region 210, the navigation region 214, and the content region 218 may function as described with respect to FIG. 2A.

Figure 2C:
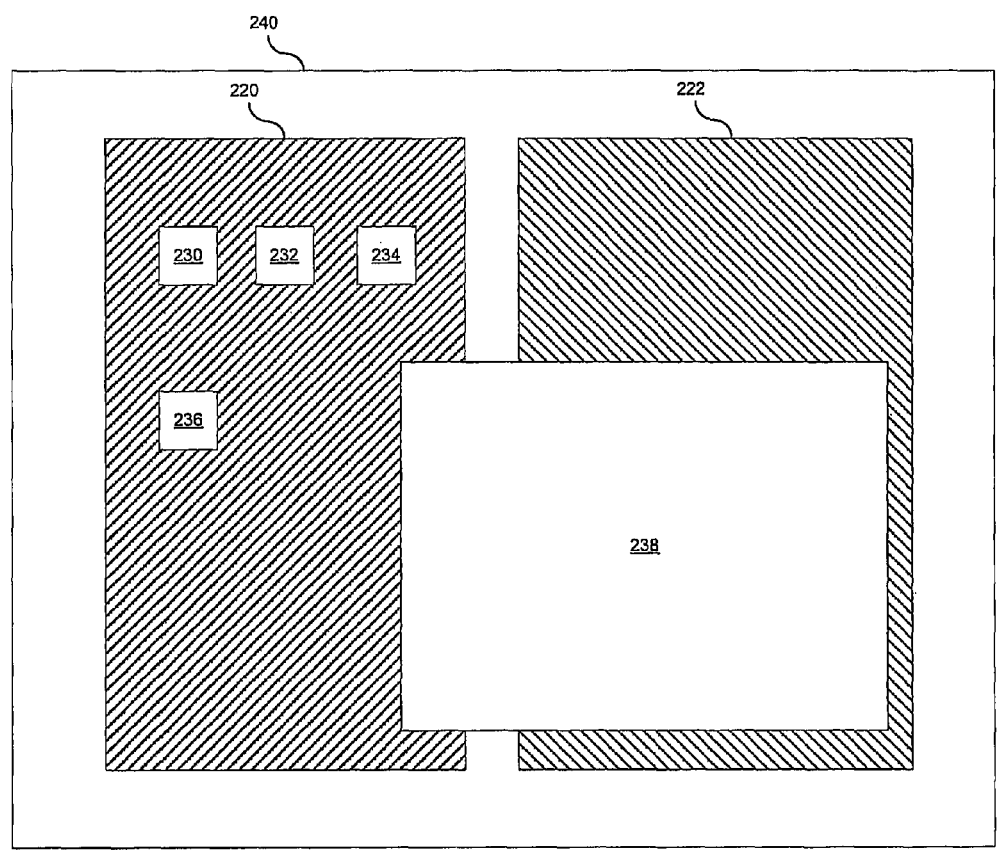
FIG. 2C is a block diagram illustrating an exemplary content based user interface, in accordance with an embodiment of the invention.

FIG. 2C is a block diagram illustrating an exemplary content based user interface, in accordance with an embodiment of the invention. Referring to FIG. 2C, there is shown a user interface or UCAM 240 and content components 220, 222, 230, 232, 234, 236 and 238.

The user interface or UCAM 240 may be part of the home-screen for the display 204 shown in FIGS. 2A and 2B. For example, the user interface or UCAM 240 may comprise the fixed region 210, the control region 214 and/or the content region 218. The user interface or UCAM 240 may provide a visual and/or audio interactive environment and/or navigation control for a local device such as the electronic device 202. The user interface or UCAM 240 may present multimedia content such as visual, audio and/or text content that a user may interact with. For example the user interface 240 may be a screen comprising content components 220, 222, 230, 232, 234, 236 and 238 that a user may select or activate. The content components 220, 222, 230, 232, 234, 236 and/or 238 may comprise visual and/or audio content that a user may interact with or may utilized to gain access to other content. For example, the content component 230 may be an icon that a user may select to gain access to, for example, a local media file or a web page on an external server. Selection of a content component such as 220, 222, 230, 232, 234, 236 and/or 238 may cause the local device to play a song, display text and/or play streaming video for example. The invention is not limited to any specific type of content or any specific way of accessing the content and may utilize any suitable content and/or content access method. For example, a user may utilize the content components 220, 222, 230, 232, 234, 236 and/or 238 to access content stored internally on the local device or may access content via a connection to one or more other devices or via a service provider.

In accordance with an embodiment of the invention, the user interface or UCAM 240 may be personalized or customized by the user. In this regard, the user may choose, create, arrange and/or organize content to be utilized for the user interface or UCAM 240 and/or one or more content components 220, 222, 230, 232, 234, 236 and 238. For example, the user may organize the content components 220, 222, 230, 232, 234, 236 and/or 238 on a screen and may choose content such as personal photographs for background, sponsored content and/or icon images. In addition, the user may create and/or modify the way content components 220, 222, 230, 232, 234, 236 and/or 238 are activated or presented to the user. For example, the user may create, import and/or edit icons and/or backgrounds for the user interface or UCAM 240. Moreover, the user may associate and/or map the icon to a function so that the user may enable or activate a function via the icon. Exemplary icons may enable functions such as hyper-links, bookmarks, programs/applications, shortcuts, widgets, RSS feeds or markup language feeds or information and/or favorite buddies. In addition, the user may organize and/or arrange content components within the user interface or UCAM 240. For example, the icons may be organized by category into groups. Icons such as content components 230, 232, 234 and/or 236 may be identified as belonging to a group or category by a user that may be referred to as an affinity bank, for example. Furthermore, in various embodiments of the invention, one or more content components 220, 222, 230, 232, 234, 236 and 238 may be made available for public access or may be made accessible only to the user of the local device. The publicly accessible content components may be utilized by others.

Personalization and/or customization, for example modification, and/or organization of the user interface or UCAM 240, and/or granting accessibility to the content components 220, 222, 230, 232, 234, 236 and/or 238 may be done on the local device and/or may be done on another device such as a laptop or computer. In this regard, a user screen and/or audio that may be personalized and/or customized on another device may be side loaded to the local device via a short range wireless, wired or optical connection. In addition, side loaded user interface or UCAM 240 information may be modified on the local device. For example, a user interface or UCAM 240 screen may be side loaded from a PC to a mobile phone and may be customized on the mobile phone. One or more software tools may enable the personalization or customization of the user interface or UCAM 240 and/or audio or visual content components 220, 222, 230, 232, 234, 236 and/or 238.

In various embodiments of the invention, a user may make all or a portion of the user interface or UCAM 240 available to other users and/or all or a portion of the user interface or UCAM 240 private, or protected. In this regard, the local device, for example a user's mobile phone may function as a server to other users and/or remote devices and the user interface or UCAM 240 may be a for example, a website. The other users and/or devices may access the user interface or UCAM 240 via a network such as a wireless network and/or line connection. The user interface or UCAM 240 may provide access to content and/or applications that may be stored on a remote server and/or stored on the local device for example.

In an exemplary embodiment of the invention, most of the personalization and/or customization may be performed on a PC or laptop, for example, the other device 108 shown in FIG. 1 and then sideloaded to a handheld device such as the cellphone 106a. In this regard, an applet, for example, a java applet may be temporarily downloaded to the PC/laptop 108 from a server and may be utilized for a personalization/customization session. The user may generate a personalized user interface or UCAM 240 and may store it on the server and/or on the PC/laptop 108. This method of personalization and/or customization may take advantage of various features and functionality of the PC/laptop 108, for example, more flexible manipulation such as drag and drop and/or better visualization of a great number of content components such as icons and background. Furthermore, in certain instances, for example, some of the personalization and/or customization activity may be best suited for the cellphone 106a. For example, timely capture of a picture, storing it and accessing it may be performed by the cellphone 106a. In this regard, a portion of the personalization and/or customization may be done on the cellphone 106a. In this manner, users may tailor the way they access content and may implement their preferred tools and devices at various stages of generating a user interface or UCAM 240.

Figure 3A:
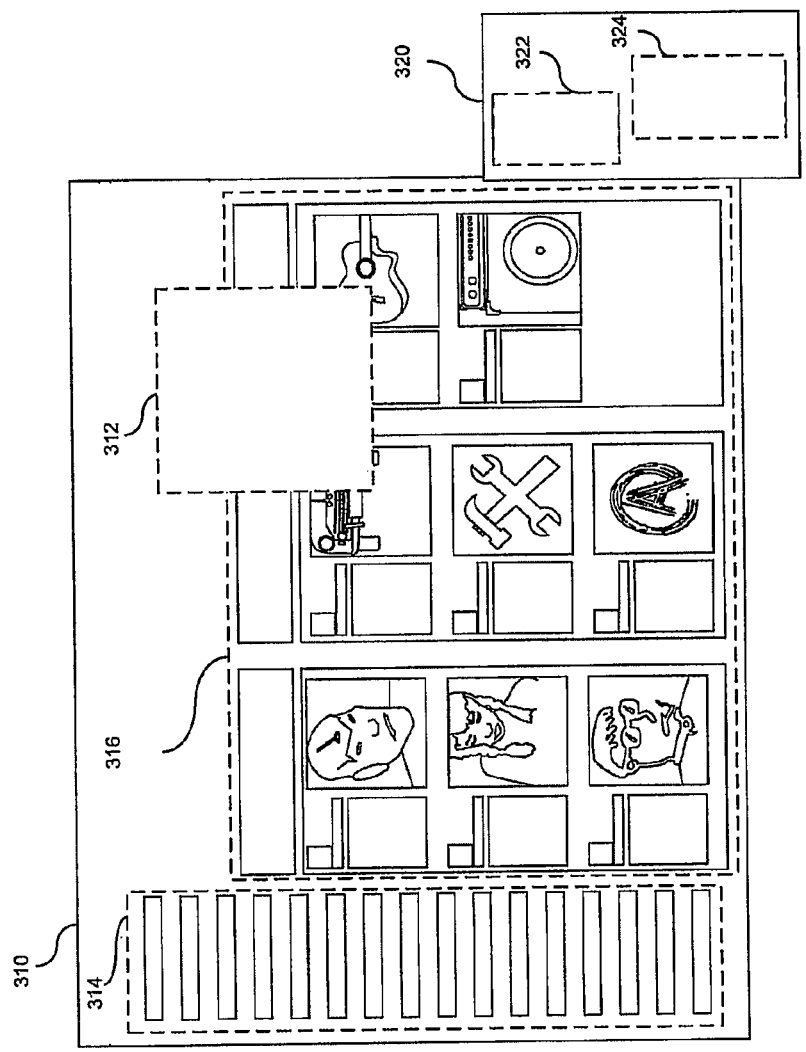
FIG. 3A is a diagram illustrating an exemplary method for personalizing and/or customizing a user interface, in accordance with an embodiment of the invention.

FIG. 3A is a diagram illustrating an exemplary method for personalizing and/or customizing a user interface, in accordance with an embodiment of the invention. Referring to FIG. 3A there is shown two of four editing screens 310 and 320 as well as editing sub-screens 312, 314, 316, 322 and 324 for a software tool that may enable personalization and/or customization of the user interface or UCAM 240.

Figure 3B:
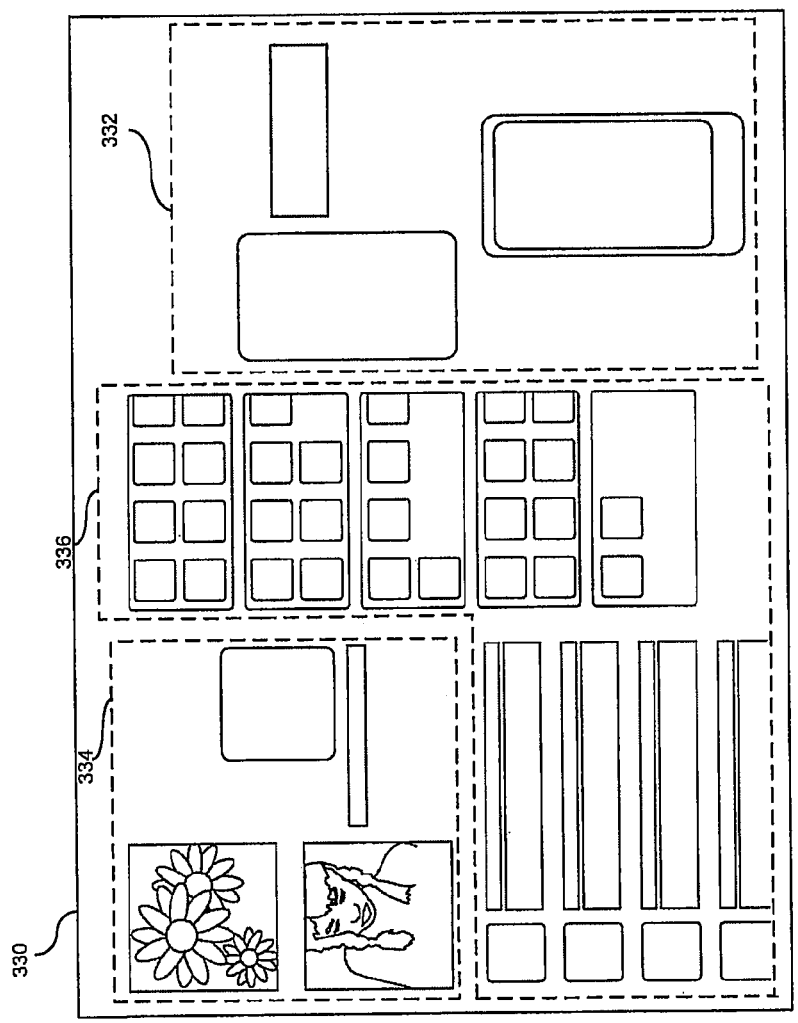
FIG. 3B is a diagram illustrating an exemplary method for personalizing and/or customizing a user interface, in accordance with an embodiment of the invention.
Figure 3C:
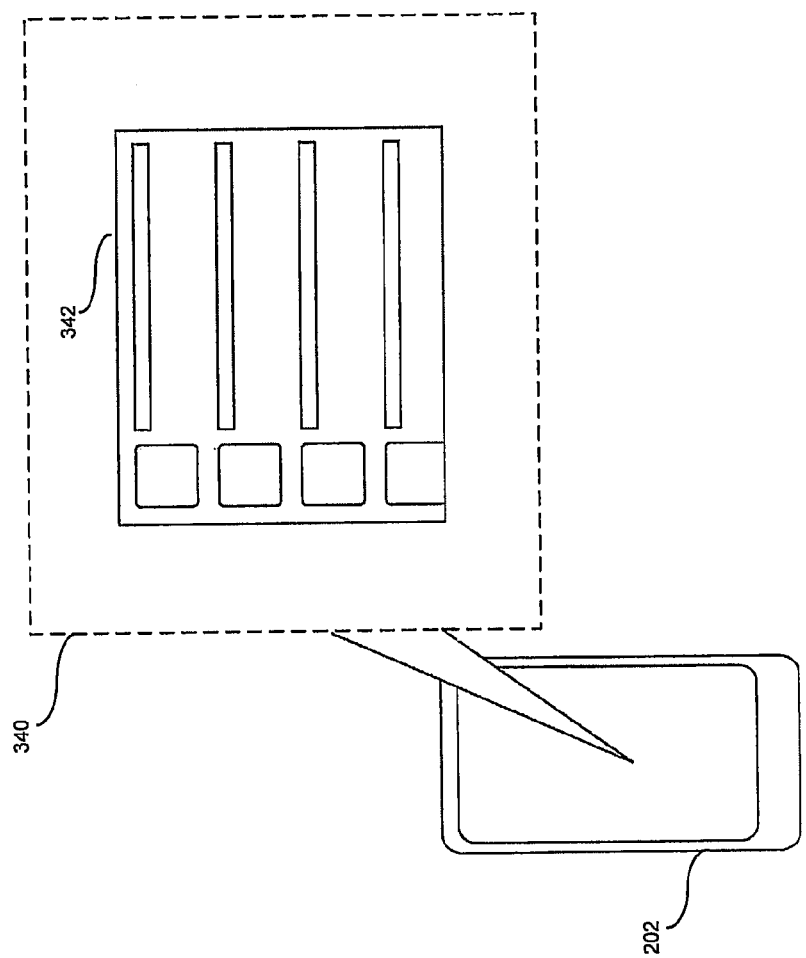
FIG. 3C is a diagram illustrating an exemplary method for personalizing and/or customizing a user interface, in accordance with an embodiment of the invention.

A software tool that may be loaded on and/or utilized by one or more electronic devices such as the electronic devices 106 and/or 108 may comprise one or more of the editing screens 310 and 320 as well as the editing screens 330 and 340 shown in FIGS. 3B and 3C respectively. The software tool comprising one or more of the editing screens 310, 320, 330 and/or 340 may enable loading such as side loading of icons from for example, a PC to a mobile phone or visa versa. In this regard, icons may be personalized and/or customized on an a first electronic device for example a PC/laptop such as the other device 108 shown in FIG. 1 and side loaded to a mobile phone 106. Loading may occur from any other device, whether by peer-to-peer and/or network communication, and/or by wired and/or wireless communication. In another embodiment of the invention, icons or content may be side loaded from the PC/laptop 108 to the mobile phone 106 and may be customized on the mobile phone 106.

The editing screen 310 may enable personalization, customization and/or creation of icons. In this regard, icons may be selected, created, formatted, sized and/or edited via the screen 310. Additionally, one or more of a plurality of content types such as text, still images or drawings, video and/or audio, for example, may be utilized for creating and/or customizing icons. In addition, the icons may be organized by or identified with categories that may be referred to as affinity groups. Exemplary affinity groups may be avatars, toolkit and/or music. The editing screen 310 may enable mapping of icons to a function and/or content via the editing sub-screen 332. In this regard, an icon may be associated, mapped or may enable, for example, a hyper link, a book mark, short cut, widget, RSS or markup language feed and/or a favorite buddy. The association and/or mapping of icons to remote or local content and/or functions may be done on the local electronic device 202 or may be done on a PC and side loaded to the local electronic device 202. In various embodiments of the invention, icons may be made accessible to other users, for example, from remote devices. Alternatively, icons may be made inaccessible to other users. Editing screen 310 may also be utilized to associate icons with accounts or to be sponsored by one or more brands. The editing screen 310 may comprise the editing sub-screens 312, 314 and/or 316 for example. The sub-screen 314 may comprise links and/or menus to local or remote content for creating or customizing an icon. The sub-screen 314 may enable editing icons for example selecting or editing content such as text, photos, video, audio and/or drawing. Icons may be identified with categories or affinity groups via the sub-screen 314. In addition, icons may be mapped to or associated with remote or local content, for example, RSS or markup language feeds, hyper links, files and/or applications comprising any content such as pictures, sound, video and text. In some embodiments of the invention, icons may be associated with an account or brand name. For example, icons may be sponsored by a company and the use of the icon may generate revenue or provide information about usage of the icon. The sub-screen 312 may be a pop up window for editing and/or previewing an icon.

The editing screen 320 may comprise the editing sub-screens 322 and/or 324. For example, the sub-screens 322 and/or 324 may comprise links and/or menus to content for creating backgrounds. Additionally, the sub-screens 322 and/or 324 may comprise information for creating and/or editing a plurality of backgrounds. The sub-screens 322 and/or 324 may comprise, for example, a pop up window for editing and/or previewing background content. The editing screen 320 may enable importation, creation and/or modification of background content. In this regard, content for backgrounds may be selected, created, formatted, sized and/or edited via the editing screen 320. Additionally, one or more of a plurality of content types such as text, still images or drawings, video and/or audio may be utilized for backgrounds. In various embodiments of the invention, backgrounds may be made public and are thus accessible to other users, for example, from remote devices. Alternatively, backgrounds may be made inaccessible to other users, and in this regards, remain private. In some embodiments of the invention, backgrounds may be associated with an account or brand name. For example, backgrounds may be sponsored by a company and the use of the icon may generate revenue or provide information about usage of the icon.

In accordance with various embodiments of the invention, the backgrounds may be identified with categories and/or affinity groups, for example, avatars, toolkit and/or music via the editing screen 320. The editing screen 320 may enable loading such as side loading of backgrounds from for example, a PC to a mobile phone. In this regard, backgrounds may be customized on the PC and side loaded to the mobile phone. In another embodiment of the invention, backgrounds or content may be side loaded from the PC to the mobile phone and may be customized on the mobile phone via the user editing screen 320. Moreover, the editing screen 320 may enable mapping of backgrounds to a function and/or content via the editing sub-screen 322. In this regard, a background may be associated with, mapped to or may enable, for example, a hyper link, a book mark, short cut, widget, RSS or markup language feed, and/or a favorite buddy. The association and/or mapping of backgrounds to remote or local content and/or functions may be done on the local electronic device 202 or may be done on a PC and side loaded to the local electronic device 202.

FIG. 3B is a diagram illustrating an exemplary method for personalizing and/or customizing a user interface, in accordance with an embodiment of the invention. Referring to FIG. 3B, there is shown editing screens 330 as well as editing sub-screens 332, 334 and 336 for a software tool that may enable personalization and/or customization of the user interface or UCAM 240. The editing screen 330 may be utilized for creating and/or modifying a user interface such as the user interface or UCAM 240 shown in FIG. 2C. For example, the editing screen 310 may enable mapping of icons to a function and/or content via the editing sub-screen 332. In this regard, an icon may be associated, mapped or may enable, for example, a hyper link, a book mark, short cut, widget, RSS or markup language feed and/or a favorite buddy. The association and/or mapping of icons to remote or local content and/or functions may be done on the local electronic device 202 or may be done on a PC and side loaded to the local electronic device 202. In addition, the sub-screen 332 may enable identifying an icon and/or background to a category or affinity bank. Functional icons may be stored in a library as shown in the editing sub-screen 336. In this regard, functional icons may be selected and/or edited via the screen editing screen 330.

FIG. 3C is a diagram illustrating an exemplary method for personalizing and/or customizing a user interface, in accordance with an embodiment of the invention. Referring to FIG. 3C, there is shown the electronic device 202 and the editing screen 340 comprising the editing sub-screen 342 for a software tool that may enable personalization and/or customization of the user interface or UCAM 240.

The editing screen 340 may be utilized for creating and/or modifying a user interface such as the user interface or UCAM 240 shown in FIG. 2C. The editing sub-screen 342 may enable association and/or mapping of icons to local content and/or functions that may be activated on the local electronic device 202. In this regard local content and/or functions may be activated via the mapped icons from a private and/or protected screen and/or a screen with public access. The association and/or mapping of icons to local content and/or functions may be done on the local electronic device 202 or may be done on a PC and side loaded to the local electronic device 202.

In operation, a user may personalize and/or customize a user interface or UCAM 240. For example, a user may personalize and/or customize the user interface UCAM 240 utilizing the editing screens 310, 320, 330 and/or 340. The user interface or UCAM 240 may be personalized and/or customized on a PC and may be side loaded to a local device such as a mobile phone for use. Moreover, a user interface 240 may be created and/or customized on a PC and may be side loaded to the local device such as the mobile phone and may be customized on the mobile phone. In this regard, the user may personalize and/or customize a user interface such as the user interface 240 via the editing screens 310, 320, 330 and/or 340. For example the user may choose content for icons and/or background via the screens 310 and/or 320. In addition, the user may edit the icons and/or backgrounds in a plurality of ways, for example, the user may associate or map an icon or background to a function, may organize icons and/or backgrounds within categories or affinity banks, may associate icons and/or backgrounds with accounts or brands and/or may make icons and/or backgrounds accessible to other users or inaccessible to other users.

Figure 4A:
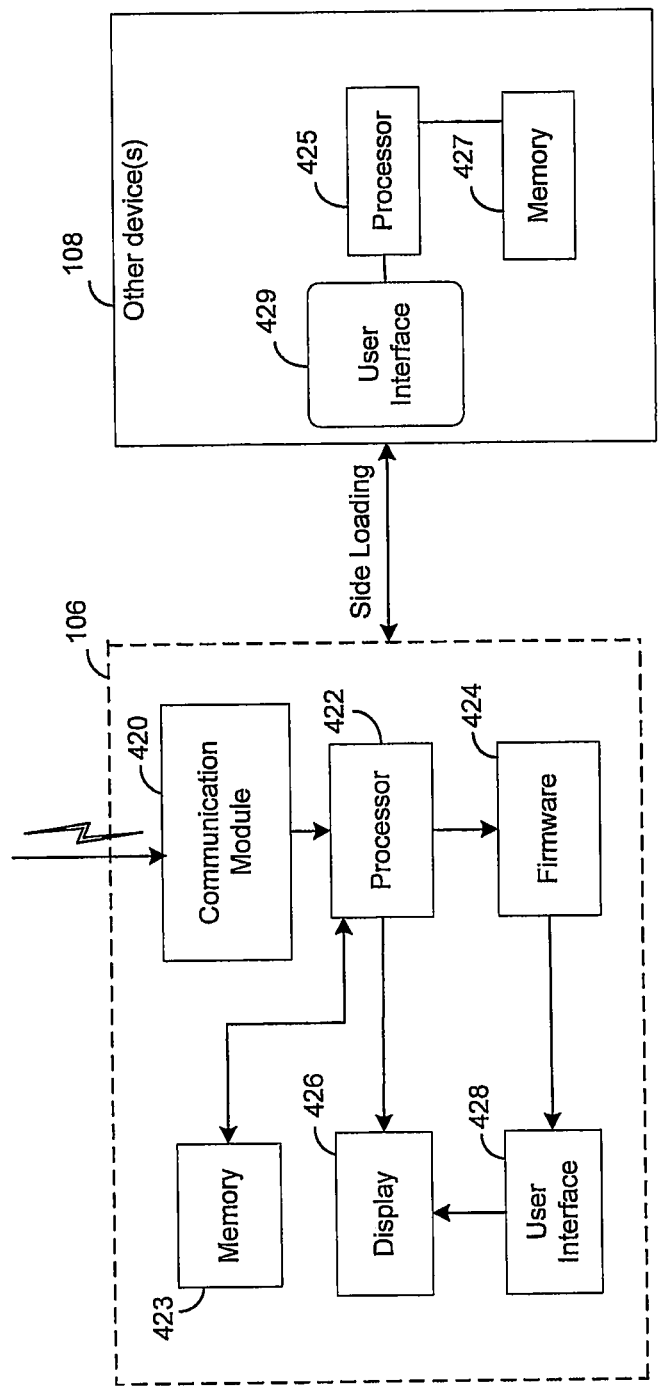
FIG. 4A is a block diagram of exemplary electronic devices enabled for user interface customization and/or side loading, in accordance with an embodiment of the invention.

FIG. 4A is a block diagram of exemplary electronic devices enabled for user interface customization and/or side loading, in accordance with an embodiment of the invention. Referring to FIG. 4A, there is shown a first electronic device 106 that may be for example a multimedia device 106a, a cell phone/smart phone 106b, a PC, laptop or a notebook computer 106c, a display device 106d and/or a TV 106e shown in FIG. 1. The first electronic device 106 may comprise a communication module 420, a processor 422, memory 423, firmware 424, a display 426, and a user interface or UCAM 428. The first electronic device 106 may be wired and/or wirelessly connected to a plurality of other devices 108 for side loading of information. The user interfaces or UCAMS 428 and/or 429 may be similar or substantially the same as the user interface or UCAM 240.

The communication module 420 may be enabled to receive the communicated control signals via a wired and/or a wireless signal. For example, the communication module 420 may receive control signals from the MEMS sensing module 104 that may enable control of the user interface 428, for example, scrolling, zooming, and/or 3-D navigation. The communication module 420 may support a plurality of interfaces. For example, the communication modules 420 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound (I2S) interface, an inter-integrated circuit (I2C) bus interface, a universal serial bus (USB) interface, a Bluetooth interface, a ZigBee interface, an IrDA interface, and/or a wireless USB (W-USB) interface.

The processor 422 may comprise suitable logic, circuitry and/or code that may be enabled to utilize the received one or more control signals to control the user interface 428 and/or the display 426. Moreover, the processor 422 may be enabled to personalize and/or customize the user interface or UCAM 428 via one or more software tools that may comprise editing screens such as the editing screens 310, 320, 330 and/or 340. The memory 423 may comprise suitable logic, circuitry and/or code that may be enabled to store data on the first electronic device 106. The firmware 424 may comprise a plurality of drivers and operating system (OS) libraries to convert the received control signals into functional commands. The firmware 424 may be enabled to map local functions, and convert received control signals into compatible data, such as user customization features, applets, and/or plugins to control the user interface or UCAM 428.

The first electronic device 106 may be enabled to receive one or more inputs defining the user interface or UCAM 428 from a second electronic device 108. The second electronic device 108 may comprise a user interface or UCAM 429, memory 427 and a processor 425. The second electronic device 108 may be one or more of a PC, laptop or a notebook computer and/or a handheld device, for example, a multimedia device and/or a cell phone/smart phone. In this regard, data may be transferred from the second electronic device 108 to the first electronic device 106 via side loading. For example, the first electronic device 106 and the second electronic device 108 may be directly connected via a wireless, wire line or optical connection for example and may transfer data without use of a service provider's network. The transferred data may be associated or mapped to media content that may be remotely accessed by the first electronic device 106 via a service provider such as a cellular, PCS and/or Internet service provider. An operator of carrier network 424 (FIG. 4B) may be an exemplary service provide. For example, the transferred data may be mapped to a website, a remote application or a local file for example. The transferred data that is associated or mapped to media content may be utilized to customize the user interface or UCAM 428 of the first electronic device 106. In this regard, media content associated with one or more received inputs may become an integral part of the user interface or UCAM 428 or the first electronic device 106.

In some embodiments of the invention, the processor 425 in the second electronic device 108 may be operable to personalize and/or customize the user interface or UCAM 429, for example, to the processor 425 may associate or map the data to media content that may be remotely accessible by the first electronic device 106 prior to transferring or side loading the mapped data to the first electronic device 106. In other embodiments of the invention, the processor 422 in the first electronic device 106 may be operable to associate or map the data to media content that is remotely accessible by the first electronic device 106.

Figure 4B:
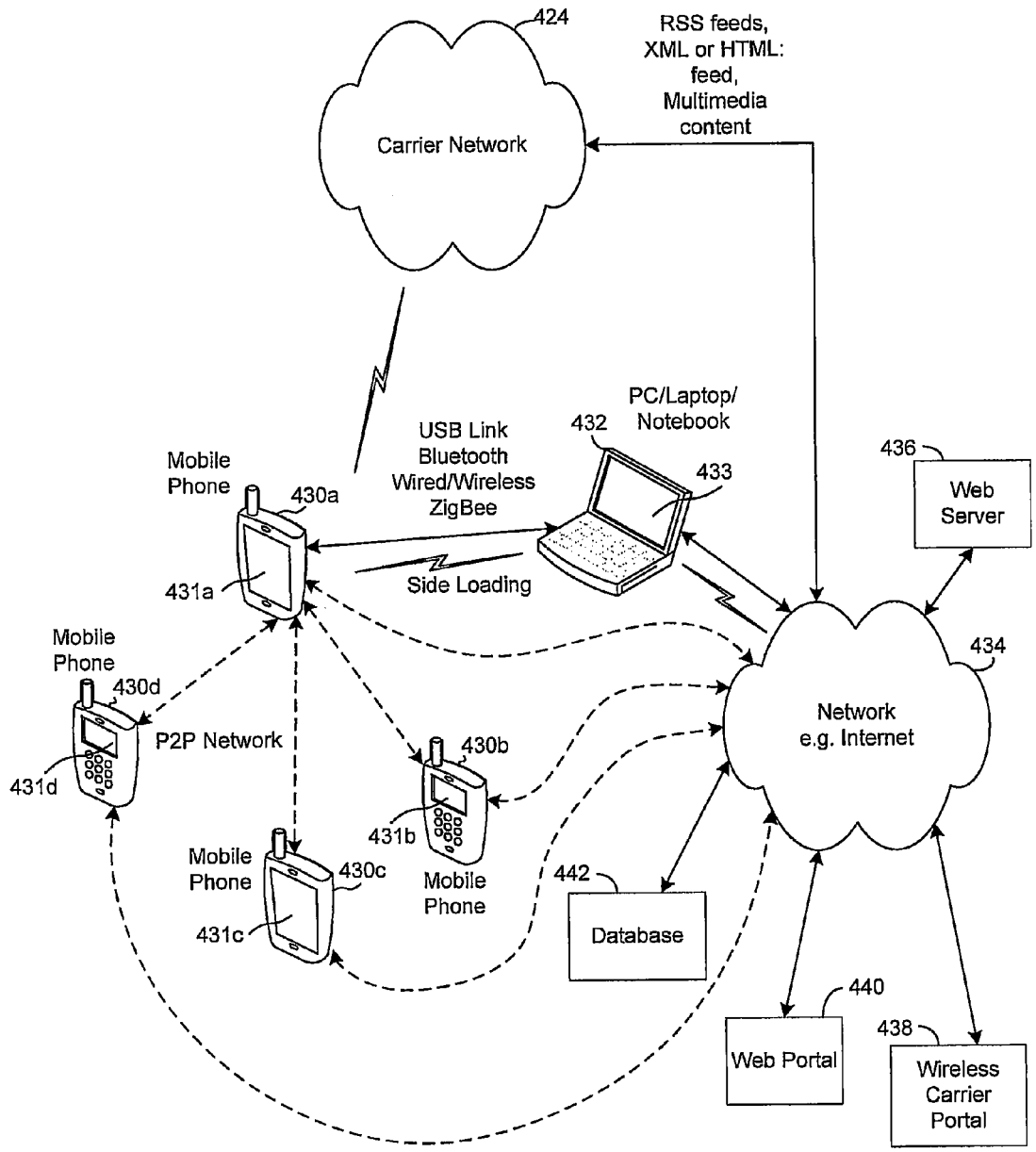
FIG. 4B is a block diagram of an exemplary system for side loading of information between two or more devices, in accordance with an embodiment of the invention.

FIG. 4B is a block diagram of an exemplary system for side loading of information between two or more devices, in accordance with an embodiment of the invention. Referring to FIG. 4B, there is shown a carrier network 424, a plurality of electronic devices that may be similar or substantially the same as the electronic devices 106 and/or 108, comprising a plurality of mobile phones 430a, 430b, 430c and 430d, a PC, laptop or a notebook computer 432 connected to a network 434, such as the Internet. The network 434 may be coupled to a web server 436, a wireless carrier portal 438, a web portal 440 and/or a database 442. Each of the plurality of the electronic devices may comprise a user interface or UCAM similar to or substantially the same the user interface or UCAM 240 and/or may comprise or have access to one or more software tools for editing the user interface and/or UCAM that may comprise editing screens such as the editing screens 310, 320, 330 and/or 340. For example, the mobile phone 430a may have a user interface or UCAM 431a, the mobile phone 430b may have a user interface or UCAM 431b, the mobile phone 430c may have a user interface or UCAM 431c and the mobile phone 430d may have a user interface or UCAM 431d. The PC, laptop or a notebook computer 432 may have a user interface or UCAM 433.

The carrier network 424 may be a wireless access carrier network. Exemplary carrier networks may comprise 2G, 2.5G, 3G, 4G, IEEE802.11, IEEE802.16 and/or suitable network capable of handling voice, video and/or data communication. The plurality of electronic devices 430 may be wirelessly connected to the carrier network 424. One of the devices, such as mobile phone 430*a* may be connected to a plurality of mobile phones 430*b*, 430*c* and 430*d* via a peer-to-peer (P2P) network, for example. In this regard the device mobile phone 430*a* may be communicatively coupled to a PC, laptop, or a notebook computer 432 via a wired or a wireless network. For example, the mobile phone 430*a* may be communicatively coupled to the PC, laptop, or a notebook computer 432 via an infrared (IR) link, an optical link, an USB link, a wireless USB, near field communication (NFC), a Bluetooth link and/or a ZigBee link. Notwithstanding, the invention may not be so limited and other wired and/or wireless links may be utilized without limiting the scope of the invention. The PC, laptop, or a notebook computer 432 may be communicatively coupled to the network 434, for example, the Internet network 434 via a wired or a wireless network. The plurality of electronic devices, such as the plurality of mobile phones 430*a*, 430*b*, 430*c* and 430*d* may be wirelessly connected to the Internet network 434.

The web server 436 may comprise suitable logic, circuitry, and/or code that may be enabled to receive, for example, HTTP and/or FTP requests from clients or web browsers installed on the PC, laptop, or a notebook computer 432 via the Internet network 434, and generate HTTP responses along with optional data contents, such as HTML documents and linked objects, for example.

The wireless carrier portal 438 may comprise suitable logic and/or code that may be enabled to function as a point of access to information on the Internet network 434 via a mobile device, such a mobile phone 430*a*, for example. The wireless carrier portal 438 may be, for example, a website that may be enabled to provide a single function via a mobile web page, for example.

The web portal 440 may comprise suitable logic and/or code that may be enabled to function as a point of access to information on the Internet 434. The web portal 440 may be, for example, a site that may be enabled to provide a single function via a web page or site. The web portal 440 may present information from diverse sources in a unified way such as e-mail, news, stock prices, infotainment and various other features. The database 442 may comprise suitable logic, circuitry, and/or code that may be enabled to store a structured collection of records or data, for example. The database 442 may be enabled to utilize software to organize the storage of data.

In accordance with an embodiment of the invention, the electronic devices, such as the mobile phone 430*a* may be enabled to receive one or more inputs defining a user interface or UCAM 428 from another device, such as the PC, laptop, or a notebook computer 432. One or more processors 422 within the electronic devices 430 may be enabled to personalize and/or customize the user interface 428 of the device being controlled, such as the mobile phone 430*a* so that content associated with one or more received inputs may become an integral part of the user interface or UCAM 428 of the electronic devices, such as the mobile phone 430*a*. The mobile phone 430*a* may be enabled to access content directly from the PC, laptop, or a notebook computer 432 rather than from the carrier network 424. This method of uploading and/or downloading customized information directly from the PC, laptop, or a notebook computer 432 rather than from the carrier network 424 may be referred to as side loading.

In accordance with one embodiment of the invention, the user interface or UCAM 428 may be personalized and/or customized by the user 402. In this regard, the user 402 may personalize and/or customize the user interface or UCAM 428. For example, the user 102 may choose, select, create, arrange, manipulate and/or organize content to be utilized for the user interface or UCAM 428 and/or one or more content components. Accordingly, the user 102 may organize the content components on a screen and may choose content such as personal photographs for background and/or icon images. In addition, the user 102 may create and/or modify the way content components are activated or presented to the user 102. For example, the user 102 may make, import and/or edit icons and/or backgrounds for the user interface or UCAM 428. Accordingly, the user 102 may associate and/or map the icon to a function so that the user 102 may enable or activate a function via the icon. Exemplary icons may enable functions such as hyper-links, book marks, programs/applications, shortcuts, widgets, RSS or markup language feeds or information and/or favorite buddies.

In addition, the user 102 may organize and/or arrange content components within the user interface or UCAM 428. For example, the icons may be organized by category into groups. Groups of icons such as content components may be referred to as affinity banks, for example. In some embodiments of the invention, the processor 425 in the second device 108 (that may be for example the PC, laptop or notebook 432) may be operable to associate or map the data to media content that is remotely accessible by the electronic device 106 (that may be for example the mobile phone 430*a*). In other embodiments of the invention, the processor 422 in the electronic device 106, such as the mobile phone 430*a* may be operable to associate or map the data to media content that is remotely accessible by the electronic device 106, such as the mobile phone 430*a*. For example, the processor 422 may be enabled to associate and/or map an icon to a function so that the user 102 may enable or activate a function via the icon and may organize and/or arrange content components within the user interface or UCAM 428.

Personalization and/or customization of the user interface or UCAM 428 and/or content components may be performed on one or more of a plurality of suitable electronic devices, for example, the laptop/PC 432 and/or any of the electronic devices 430. In this regard, one or more of a plurality of electronic devices, for example, the laptop/PC 432 and/or any of the electronic devices 430 may comprise or have access to a software tool that may comprise, for example, editing screens such as the editing screens 310, 320, 330 and/or 340 that may enable personalization and/or customization of the user interfaces or UCAMs 431 or 433. A user may take advantage of the features and/or functionality of an available electronic device to enhance personalization and/or customization of the user interfaces or UCAMs 431 or 433 therein. In this regard, a user screen and/or audio that may be personalized and/or customized on a first device, such as the PC, laptop, or a notebook computer 432 may be side loaded to the a second electronic device, such as mobile phone 430*a*. In addition, a user interface or UCAM 431 may be personalized and/or customized on an electronic device such as mobile phone 430*a*. Moreover, a user interface or UCAM 433 may be side loaded from the PC, laptop, or a notebook computer 432 to the mobile phone 430*a* and may then be customized on the mobile phone 430*a* as user interface or UCAM 431*a*. One or more tools and/or software may enable personalization and/or customization of the user interfaces or UCAMs 431 and/or 433 and/or audio or visual content components. In one aspect of the invention, once data is mapped on the mobile phone 430*a* to remotely accessible multimedia content that mapped data may become an integral part of the user interface or UCAM 431*a* of the mobile phone 430*a*. Similarly, once data is mapped on the PC or laptop 432 and is transferred to the mobile phone 430a, the mapped data may become an integral part of the user interface or UCAM 431a of the mobile phone 430a.

In an exemplary embodiment of the invention, most of the personalization and/or customization may be performed on a PC or laptop, for example, the PC/laptop/notebook 432 and then loaded, via for example, side loading or other peer-to-peer or networked communication, to one or more handheld devices such as the mobile phone 430a. In this regard, an applet, for example, a java applet may be temporarily downloaded to the PC/laptop/notebook 432 from a server, for example the web server 436 and may be utilized for a personalization/customization session. The user may generate a personalized user interface or UCAM 433 and may store it on the web server 436 and/or on the PC/laptop/notebook 432. This method of personalization and/or customization may take advantage of various features and functionality of the PC/laptop/notebook 432, for example, more flexible manipulation such as drag and drop capability and/or better visualization of a great number of content components such as icons and background. Furthermore, in certain instance, for example, some of the personalization and/or customization activity may be best suited for the mobile phone 430a. For example, timely capture of a picture, storing it and/or accessing it may be best performed by the mobile phone 430a. Accordingly, a portion of the personalization and/or customization of the user interface or UCAM 431a may be done on the mobile phone 430a. In this manner, users may tailor the way they access content and may implement their preferred tools on preferred electronic devices at various stages of generating a user interface or UCAM.

Figure 5:
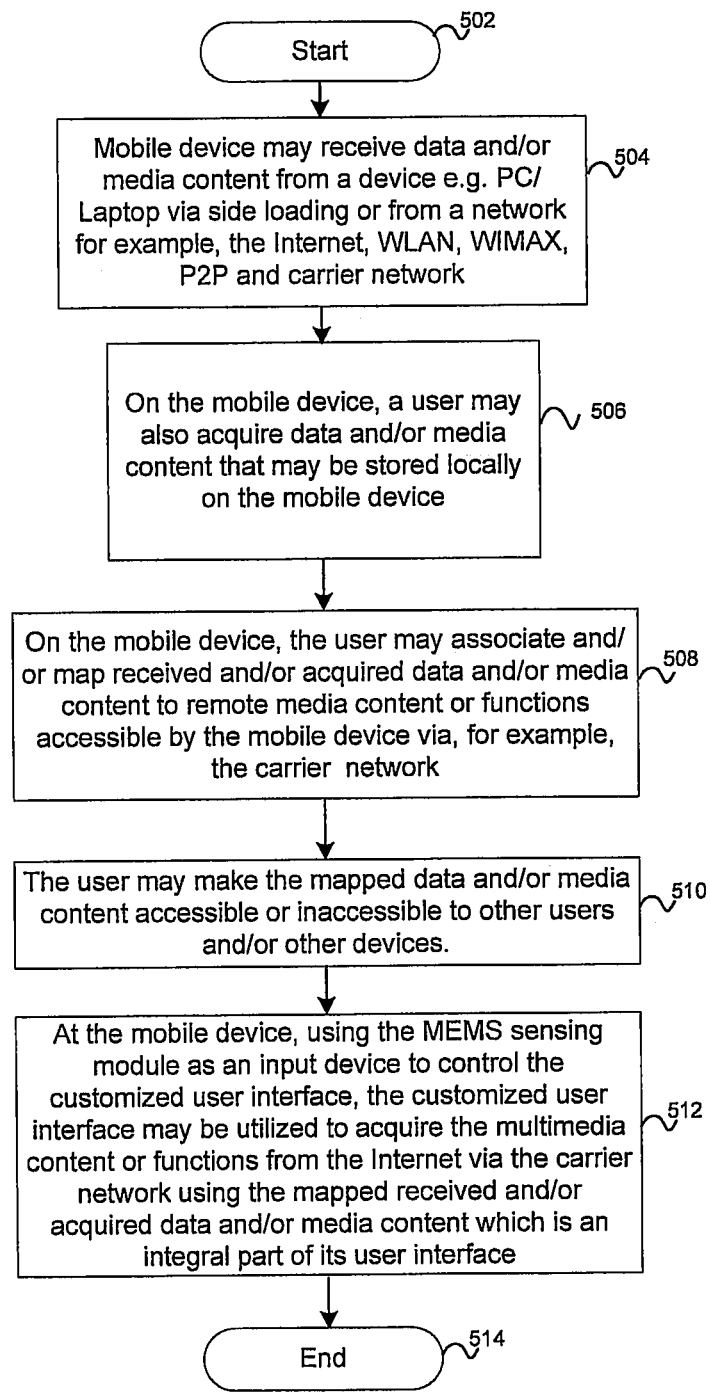
FIG. 5 is a flow chart illustrating exemplary steps for customizing a user interface on a mobile device at the mobile device, in accordance with an embodiment of the invention

FIG. 5 is a flow chart illustrating exemplary steps for customizing a user interface on a mobile device at the mobile device, in accordance with an embodiment of the invention. Referring to FIG. 5, after start step 502, in step 504, a mobile device 430a may receive data and/or media content from a device such as a PC/Laptop 432 via side loading via a network such as the Internet 432, WLAN, WIMAX, P2P and carrier network. The data and/or media content may be received from, for example, the web portal 440, the wireless carrier portal 438 and/or the web server 436. Notwithstanding, in step 506, on the mobile device 430a, a user may also optionally acquire data and/or media content that may be stored locally on the mobile device 430a. In step 508, on the mobile device 430a, the user may associate and/or map the receive and/or acquired data and/or media content to remote multimedia content or functions, for example, HTML data, XML data, RSS or markup language feeds, which may be accessible by the mobile device 430a via, for example, the carrier network 424. In step 510, a user of the mobile device 430a may make the mapped data and/or media content accessible or inaccessible to other users and/or devices. In step 512, at the mobile device 430a, using a MEMS sensing module 104 as an input device, to control the customized user interface, the customized user interface may be utilized to acquire the remote multimedia content or functions from the Internet, via the carrier network, using the mapped received and/or acquired data and/or media content which is an integral part of its user interface.

Figure 6:
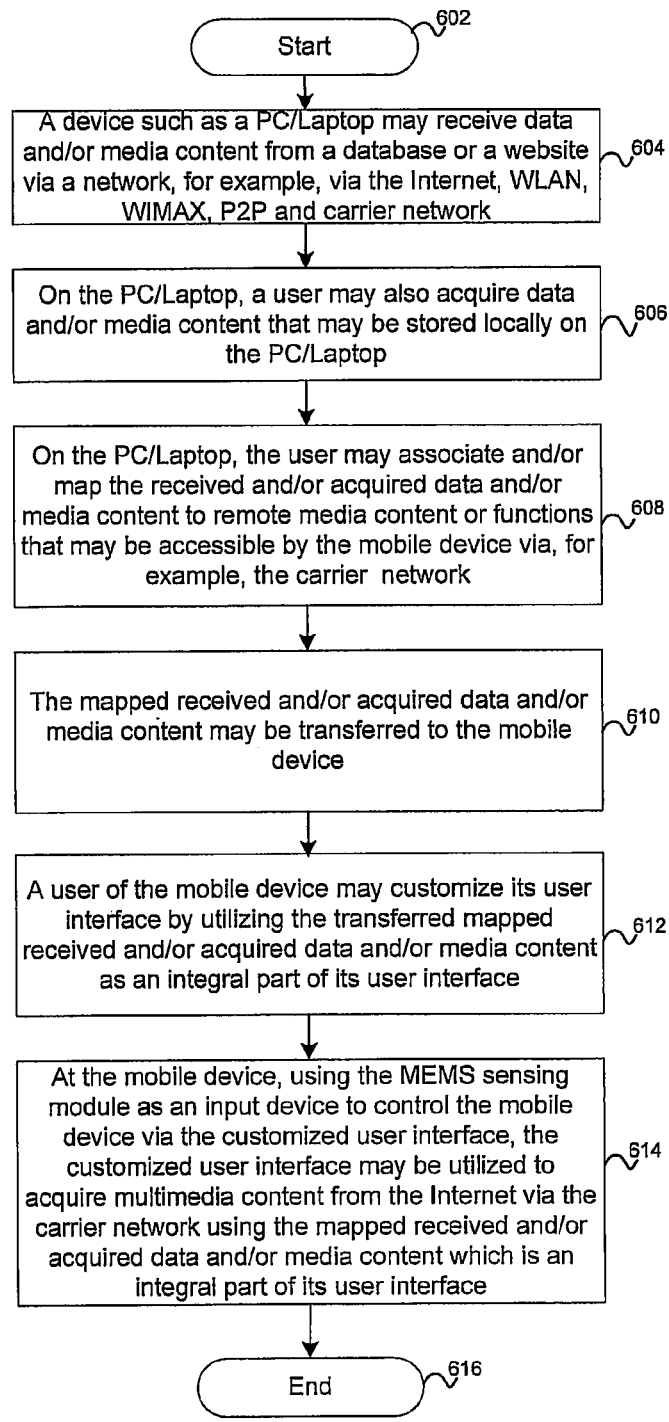
FIG. 6 is a flow chart illustrating exemplary steps for customizing a user interface on a mobile device at another device, in accordance with an embodiment of the invention.

FIG. 6 is a flow chart illustrating exemplary steps for customizing a user interface on a mobile device at another device, in accordance with an embodiment of the invention. Referring to FIG. 6, after start step 602, in step 604, a device such as a PC/Laptop 432 may receive data and/or media content from the database 442, the web portal 440, the web server 436, WLAN, WIMAX, peer-to-peer, and/or carrier network for example. In step 606, on the PC/Laptop 423, a user may also acquire data and/or media content that may be stored locally on the PC/Laptop 432. In step 608, on the PC/Laptop 432, the user may associate and/or map the received and/or acquired data and/or media content to remote multimedia content and/or functions, for example, HTML data, XML data, RSS or markup language feeds, which may be accessible by the mobile device 430a, via, for example, the carrier network 424. In step 610, the mapped received and/or acquired data and/or media content may be transferred to the mobile device 430a, where it may be utilized as part of the interface of the mobile device 430a. In step 612, a user of the mobile device 430a may customize its user interface by utilizing the transferred mapped received and/or acquired data and/or media content as an integral part of its user interface. In step 614, at the mobile device 430a, using the MEMS sensing module 104 as an input device to control the mobile device 430a via the customized user interface, the customized user interface may be utilized to acquire multimedia content from the Internet via the carrier network using the mapped received and/or acquired data and/or media which is an integral part of its user interface.

In an embodiment of the invention, a mobile device, for example, a mobile phone 430a or media player may comprise a graphical user interface 240. The graphical user interface 240 may be controlled via human touch and/or breath for example. In addition, the graphical user interface 240 may utilize data and/or content, for example, within the form of an icon, to operate and/or function as a part of the graphical interface 240. Accordingly, the data and/or content may be received from a second device, for example, a personal computer (PC), a laptop 432, and/or a handheld communication device 430b. In addition, the data and/or content such as the icon may be associated with media content that may be stored within the mobile device 430a or may be retrieved from an external third device such as a web server 436 via a wireless service provider such as the carrier network 424. The data and/or content received from the PC 432 may be associated with the retrieved media content. For example, retrieved media content may comprise an RSS or XML or HTML markup language feed, a URL and/or multimedia content remotely retrievable from, for example, the web server 436 via the service provider such as the carrier network 424. The association of received data and/or content, for example the icon, with the remotely retrieved media content located within an external server 436 for example, may be made from within the mobile device 430a or the PC 432 for example. In addition, the graphical user interface 240 may be customized utilizing the received data and/or content that may be associated with the remotely retrievable media content. In this regard, the received data and/or content may be mapped to the remotely retrievable media content accessible via the carrier network 424 and/or a wireless medium or short range communication such as WLAN, WIMAX, WAN, and/or a peer to peer connection for example Bluetooth, Near Field Communication (NFC) and ZigBee. The received data and/or content that may be mapped to the media content may be communicated from the PC 432 via a wireless connection and/or a wired connection.

A method and system are provided for a user interface 240 that enables control of a device via respiratory and/or tactual input. The mobile device, for example, mobile telephone 430a, and/or a mobile multimedia player may comprise a graphical user interface 240 that may receive data from a second device such as a PC, laptop 432, and/or a handheld communication device 432b, and/or locally from within the mobile device such as mobile telephone 430a. The received data may be associated and/or mapped so that it may function as an integral part of the graphical user interface 240. The received data may be associated and/or mapped to media content such as an RSS feed, markup language such as HTML or XML feed, a URL, and/or multimedia content that may be retrievable from an external source and may be utilized for customizing the graphical user interface 240. The mapping may occur by the mobile device 430a or by the second device 432 and then communicated (side loaded) to the mobile device 430a via a wired or wireless connection. Human breath and/or touch may be utilized as an input to control the mobile device via the graphical user interface 240.

Another embodiment of the invention may provide a machine-readable storage, having stored thereon, a computer program having at least one code section executable by a machine, thereby causing the machine to perform the steps as described herein for a method and system for customizing and side loading a user interface.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for device interaction, the method comprising:
in a mobile device comprising a customizable graphical user interface having at least a first geometric region configurable by a user of the mobile device to be responsive or non-responsive to a first mode of user input and a second geometric region separate from the first geometric region, the second geometric region configurable by the user to be responsive or non-responsive to a second mode of user input different from the first mode of user input and to be non-responsive to the first mode of user input:
receiving from a second device and/or from within said mobile device, data to be utilized for customization of said graphical user interface;
modifying said graphical user interface utilizing said received data and user input, wherein said modification comprises:
associating said received data with media content that is retrievable by said mobile device from a content source that is external to said mobile device, wherein said associated received data is operable to function as at least a portion of said graphical user interface of said mobile device and/or another device to which said associated data is transferred;
controlling via said at least a portion of said graphical user interface, consumption of said media content on said mobile device; and
transmitting said graphical user interface to a second electronic device for use on said second electronic device.

2. The method according to claim 1, comprising customizing said graphical user interface utilizing said data that is associated to said media content.

3. The method according to claim 1, comprising mapping said received data to said media content by said mobile device.

4. The method according to claim 1, wherein said second device maps said received data to said media content.

5. The method according to claim 4, wherein said data that is mapped to said media content is communicated from said second device to said mobile device.

6. The method according to claim 5, comprising receiving said mapped data from said second device via a wireless connection and/or a wired connection.

7. The method according to claim 1, wherein said media content that is retrievable by said mobile device comprise one or more of an RSS and/or XML feed, a URL, and/or multimedia content.

8. The method according to claim 1, wherein said mobile device is controllable by expulsion of breath into open space.

9. The method according to claim 1, wherein touch is utilized to control said graphical user interface.

10. The method according to claim 1, wherein said mobile device comprises one or more of a personal computer (PC), a laptop, and/or a handheld communication device.

11. The method according to claim 10, wherein said handheld device comprises one or more of a mobile telephone, and/or a mobile multimedia player.

12. The method according to claim 1, wherein transmitting comprises side-loading.

13. The method according to claim 1, wherein said second electronic device comprises a user device operable as a mobile phone.

14. The method according to claim 1, wherein use of said graphical user interface on said second electronic device comprises customization of said graphical user interface.

15. The method according to claim 1, wherein the first mode of user input comprises tactual input and the second mode of user input comprises sensing flow of human breath.

16. A system for device interaction, the system comprising:
one or more processors in a mobile device comprising a customizable graphical user interface having at least a first geometric region configurable by a user to be responsive or non-responsive to a first mode of user input and a second geometric region separate from the first geometric region, the second geometric region configurable by the user to be responsive or non-responsive to a second mode of user input different from the first mode of user input and to be non-responsive to the first mode of user input, said one or more processors are operable to:
receive from a second device and/or from within said mobile device, data to be utilized for customization of said graphical user interface;
modify said graphical user interface utilizing said received data and user input, wherein said modification comprises:
association of said received data with media content that is retrievable by said mobile device from a content source that is external to said mobile device, wherein said associated received data is operable to function as at least a portion of said graphical user interface of said mobile device and/or another device to which said associated data is transferred;

control via said at least a portion of said graphical user interface, consumption of said media content on said mobile device; and transmit said graphical user interface to a second electronic device for use on said second electronic device.

17. The system according to claim 16, wherein said one or more processors enables customization of said graphical user interface utilizing said data that is associated to said media content.

18. The system according to claim 16, wherein said one or more processors maps said received data to said media content at said mobile device.

19. The system according to claim 16, wherein one or more other processors in said second device maps said received data to said media content at said second device.

20. The system according to claim 19, wherein said data that is mapped to said media content is communicated from said second device to said mobile device.

21. The system according to claim 20, wherein said one or more processors are operable to receive said mapped data from said second device via a wireless connection and/or a wired connection.

22. The system according to claim 16, wherein said media content that is retrievable by said mobile device comprise one or more of an RSS and/or XML feed, a URL, and/or multimedia content.

23. The system according to claim 16, wherein said mobile device is controllable by expulsion of breath into open space.

24. The system according to claim 16, wherein touch is utilized to control said graphical user interface.

25. The system according to claim 16, wherein said mobile device comprises one or more of a personal computer (PC), a laptop, and/or a handheld communication device.

26. The system according to claim 25, wherein said handheld device comprises one or more of a mobile telephone, and/or a mobile multimedia player.

27. The system according to claim 16, wherein transmitting comprises side-loading.

28. The system according to claim 16, wherein said second electronic device comprises a user device operable as a mobile phone.

29. The system according to claim 16, wherein use of said graphical user interface on said second electronic device comprises customization of said graphical user interface.

30. A non-transitory machine-readable storage having stored thereon, a computer program having at least one code section for device interaction, the at least one code section being executable by a machine for causing the machine to perform steps comprising:

in a mobile device comprising a customizable graphical user interface having at least a first geometric region configurable by a user to be responsive or non-responsive to a first mode of user input and a second geometric region separate from the first geometric region, the second geometric region configurable by the user to be responsive or non-responsive to a second mode of user input different from the first mode of user input and to be non-responsive to the first mode of user input:

receiving from a second device and/or from within said mobile device, data to be utilized for customization of said graphical user interface;

modifying said graphical user interface utilizing said received data and user input, wherein said modification comprises:

associating said received data with media content that is retrievable by said mobile device from a content source that is external to said mobile device, wherein said associated received data is operable to function as at least a portion of said graphical user interface of said mobile device and/or another device to which said associated data is transferred;

controlling via said at least a portion of said graphical user interface, consumption of said media content on said mobile device; and transmitting said graphical user interface to a second electronic device for use on said second electronic device.

31. The machine-readable storage according to claim 30, wherein said at least one code section comprises code for customizing said graphical user interface utilizing said data that is associated to said media content.

32. The machine-readable storage according to claim 30, wherein said at least one code section comprises code for mapping said received data to said media content by said mobile device.

33. The machine-readable storage according to claim 30, wherein said second device maps said received data to said media content.

34. The machine-readable storage according to claim 33, wherein said data that is mapped to said media content is communicated from said second device to said mobile device.

35. The machine-readable storage according to claim 34, wherein said at least one code section comprises code for receiving said mapped data from said second device via a wireless connection and/or a wired connection.

36. The machine-readable storage according to claim 30, wherein said media content that is retrievable by said mobile device comprise one or more of an RSS and/or XML feed, a URL, and/or multimedia content.

37. The machine-readable storage according to claim 30, wherein said mobile device is controllable by expulsion of breath into open space.

38. The machine-readable storage according to claim 30, wherein touch is utilized to control said graphical user interface.

39. The machine-readable storage according to claim 30, wherein said mobile device comprises one or more of a personal computer (PC), a laptop, and/or a handheld communication device.

40. The machine-readable storage according to claim 39, wherein said handheld device comprises one or more of a mobile telephone, and/or a mobile multimedia player.

41. The machine-readable storage according to claim 30, wherein transmitting comprises side-loading.

42. The machine-readable storage according to claim 30, wherein said second electronic device comprises a user device operable as a mobile phone.

43. The machine-readable storage according to claim 30, wherein use of said graphical user interface on said second electronic device comprises customization of said graphical user interface.

* * * * *